(12) United States Patent
Nam et al.

(10) Patent No.: US 9,376,010 B2
(45) Date of Patent: Jun. 28, 2016

(54) SYSTEM FOR CONTROLLING AIR FLOW RATE INTO VEHICLE ENGINE ROOM AND CONTROL METHOD THEREOF

(71) Applicant: Hyundai Motor Company, Seoul (KR)

(72) Inventors: Jongwoo Nam, Seoul (KR); Hanshin Chung, Yongin-si (KR); Hyun Cho, Seoul (KR); Joonho Lee, Seoul (KR); Dongguk Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/516,343

(22) Filed: Oct. 16, 2014

(65) Prior Publication Data

US 2015/0165896 A1 Jun. 18, 2015

(30) Foreign Application Priority Data

Dec. 18, 2013 (KR) .......................... 10-2013-0158583

(51) Int. Cl.
*B60K 11/08* (2006.01)
*B60K 11/04* (2006.01)
(Continued)

(52) U.S. Cl.
CPC ............ *B60K 11/085* (2013.01); *B60H 1/3211* (2013.01); *B60K 11/04* (2013.01); *F01P 1/00* (2013.01); *F01P 5/02* (2013.01); *F01P 7/02* (2013.01); *F01P 7/10* (2013.01); *B60H 2001/3248* (2013.01); *B60H 2001/3255* (2013.01); *F01P 5/06* (2013.01);
(Continued)

(58) Field of Classification Search
CPC ...... B60K 11/04; B60K 11/085; B60K 11/10; B60H 1/3211; F01P 1/00; F01P 7/02; F01P 7/10; F01P 7/12; F01P 5/02; F01P 5/06; F01P 2001/005; F01P 2001/3248; F01P 2001/3255; F01P 2060/02; F01P 2060/14; F01P 2003/185; F01P 2025/13; F01P 2025/66; F01P 2025/42; F02B 29/0437
USPC ............................................................ 701/49
See application file for complete search history.

(56) References Cited

U.S. PATENT DOCUMENTS 3,794,001 A * 2/1974 Birch .................... F04D 29/164
                                                      123/41.05
4,756,279 A * 7/1988 Temmesfeld ........... F01P 11/10
                                                      123/198 E
(Continued)

FOREIGN PATENT DOCUMENTS

DE    10 2008 013 422 A1    9/2009
EP         2 594 420 A1     5/2013
(Continued)

*Primary Examiner* — McDieunel Marc
*Assistant Examiner* — James E Stroud
(74) *Attorney, Agent, or Firm* — Morgan, Lewis & Bockius LLP

(57) ABSTRACT

A system for controlling an air flow rate into a vehicle engine room may include a fan shroud in which a cooling fan including a fan motor and a fan blade may be mounted, a rotary shutter which may be provided in the fan shroud while corresponding to an operation area of the fan blade, and in which an area through which air passes may be varied in a circumferential direction, a plurality of flaps which may be provided in the fan shroud, and opens and closes a part of a portion where the rotary shutter may be not mounted, and a control unit which controls an open area of the rotary shutter, operations of opening and closing the plurality of flaps, and an operation of the cooling fan in accordance with an operating state of a vehicle.

11 Claims, 10 Drawing Sheets

(51) Int. Cl.

| | | |
|---|---|---|
| *F01P 7/10* | (2006.01) | |
| *F01P 1/00* | (2006.01) | |
| *F01P 5/02* | (2006.01) | |
| *F01P 7/02* | (2006.01) | |
| *F01P 5/06* | (2006.01) | |
| *F01P 7/12* | (2006.01) | |
| *F01P 11/10* | (2006.01) | |
| *F02B 29/04* | (2006.01) | |
| *B60H 1/32* | (2006.01) | |
| *F01P 3/18* | (2006.01) | |

(52) U.S. Cl.
 CPC . *F01P 7/12* (2013.01); *F01P 11/10* (2013.01); *F01P 2001/005* (2013.01); *F01P 2003/185* (2013.01); *F01P 2025/13* (2013.01); *F01P 2025/42* (2013.01); *F01P 2025/66* (2013.01); *F01P 2060/02* (2013.01); *F01P 2060/14* (2013.01); *F02B 29/0437* (2013.01)

(56) References Cited

U.S. PATENT DOCUMENTS

| | | | |
|---|---|---|---|
| 6,010,113 A * | 1/2000 | Rotering | F16K 3/03 251/212 |
| 6,971,631 B1 | 12/2005 | Naughton | |
| 8,639,651 B2 * | 1/2014 | Beitelmal | H05K 7/20836 706/62 |
| 8,744,631 B2 * | 6/2014 | Wang | G05D 23/1932 165/67 |
| 8,845,404 B2 * | 9/2014 | Bash | F24F 13/105 454/167 |
| 2002/0146606 A1 * | 10/2002 | Kobayashi | H01M 8/04007 429/436 |
| 2002/0170507 A1 | 11/2002 | Stauder et al. | |
| 2006/0257251 A1 * | 11/2006 | Carlson | F04D 29/661 415/178 |
| 2006/0272622 A1 * | 12/2006 | Acuna, Sr. | F02B 29/0443 123/542 |
| 2007/0213855 A1 * | 9/2007 | Furuno | E02F 9/26 700/83 |
| 2009/0217655 A1 * | 9/2009 | Yabuki | F01P 7/044 60/456 |

FOREIGN PATENT DOCUMENTS

| | | |
|---|---|---|
| WO | WO 2008/004965 A1 | 1/2008 |
| WO | WO 2010/046153 A1 | 4/2010 |

\* cited by examiner

FIG. 9A
FIG. 9B
FIG. 9C
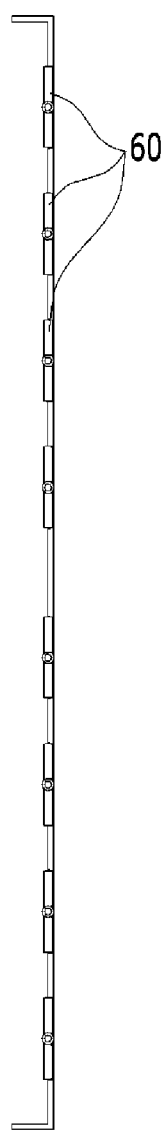
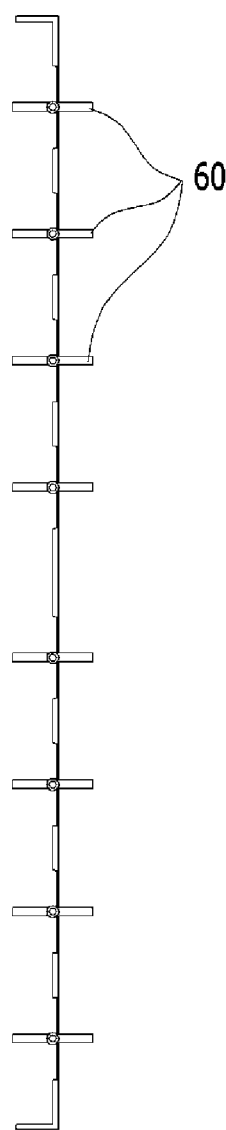
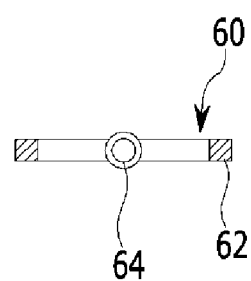

SYSTEM FOR CONTROLLING AIR FLOW RATE INTO VEHICLE ENGINE ROOM AND CONTROL METHOD THEREOF

CROSS-REFERENCE TO RELATED APPLICATION

The present application claims priority to and the benefit of Korean Patent Application No. 10-2013-0158583 filed on Dec. 18, 2013, the entire contents of which is incorporated herein for all purposes by this reference.

BACKGROUND OF THE INVENTION

1. Field of the Invention

The present invention relates to a system for controlling an air flow rate into a vehicle engine room and a control method thereof, and more particularly, to a system for controlling an air flow rate into a vehicle engine room and a control method thereof, which may improve cooling performance and aero-dynamic performance of a vehicle.

2. Description of Related Art

In general, a radiator for cooling an engine and a condenser for condensing a refrigerant in an air conditioner are mounted in a vehicle, and temperatures of the radiator and the condenser are lowered by operating a cooling fan. It is advantageous to quickly raise a temperature of the engine to an appropriate level when the vehicle is initially started in order to improve fuel efficiency, and the temperature of the engine needs to be maintained to an appropriate temperature.

The cooling fan is traditionally operated by an operation of the engine, but this mechanical method has a drawback in that fuel efficiency of the vehicle deteriorates because the cooling fan is always operated whenever the engine is operated.

Recently, a method of operating an electric motor is used, and in respect to the above method, the cooling fan is operated only out of necessity in response to a driving state of the vehicle, such that there is an effect of further improving fuel efficiency, and as a result, the use of this manner is increased.

Meanwhile, aero-dynamic characteristics greatly affect fuel efficiency and speed of the vehicle when a traveling speed of the vehicle is increased, and when air flowing into an engine room of the vehicle is shut off when the vehicle travels at a high speed, drag, which is generated when air passes through the engine room, is reduced so that fuel efficiency may be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system for controlling an air flow rate into a vehicle engine room and a control method thereof, which may improve cooling performance and aero-dynamic performance of a vehicle.

In addition, various aspects of the present invention are directed to providing a system for controlling an air flow rate into a vehicle engine room and a control method thereof, which may reduce drag by minimizing an operation of a cooling fan, and shutting off air flowing into an engine room out of necessity.

In an aspect of the present invention, a system for controlling an air flow rate into a vehicle engine room, may include a fan shroud in which a cooling fan including a fan motor and a fan blade is mounted, a rotary shutter which is provided in the fan shroud while corresponding to an operation area of the fan blade, and in which an area through which air passes is varied in a circumferential direction, a plurality of flaps which is provided in the fan shroud, and opens and closes a part of a portion where the rotary shutter is not mounted, and a control unit which controls an open area of the rotary shutter, operations of opening and closing the plurality of flaps, and an operation of the cooling fan in accordance with an operating state of a vehicle.

The rotary shutter may include a plurality of shutter blades which is provided to be rotatable about a rotation shaft, and a shutter actuator which rotates the plurality of shutter blades, and changes the area through which air passes.

The shutter blades may include an operation blade which is configured to be rotated about the rotation shaft by an operation of the shutter actuator, and a plurality of sub blades which is provided to be superimposed on a basis of the rotation shaft and engaged to the operation blade to be spread or folded fanwise in accordance with rotation of the operation blade.

The shutter blades may have operation protrusions, respectively, and when the operation blade is spread or folded, any one of the plurality of sub blades is spread or folded, and remaining sub blades are sequentially spread or folded.

Electromagnets are provided on the plurality of flaps so that the plurality of flaps is opened and closed in accordance with an electric current supplied to the electromagnets.

The fan shroud in which the rotary shutter and the plurality of flaps are provided is provided between an engine and a radiator.

The system may further include an encapsulation which surrounds the vehicle engine room.

Operation modes of the system for controlling an air flow rate into a vehicle engine room may include a first mode in which the plurality of flaps is closed, the rotary shutter is completely closed, and the operation of the cooling fan is turned off, a second mode in which the plurality of flaps is closed, the rotary shutter is completely opened, and the operation of the cooling fan is controlled based on an operating state of the vehicle, a third mode in which the plurality of flaps is opened, the rotary shutter is completely opened, and the operation of the cooling fan is turned off, and a fourth mode in which the plurality of flaps is closed, the open area of the rotary shutter is controlled, and the operation of the cooling fan is turned off.

An atmospheric temperature sensor which measures an atmospheric temperature, and outputs a corresponding signal, a speed sensor which measures a vehicle speed, and outputs a corresponding signal, an air conditioning pressure sensor which measures air conditioning internal pressure, and outputs a corresponding signal, an air conditioning switch sensor which measures an operational signal of an air conditioning switch, and outputs a corresponding signal, a refrigerant temperature sensor which measures a refrigerant temperature, and outputs a corresponding signal, and a position sensor which measures the open area of the rotary shutter, and outputs a corresponding signal, wherein the control unit determines the operating state of the vehicle based on the corresponding signals from the respective sensors, and controls operations of the rotary shutter, the plurality of flaps, and the cooling fan in accordance with the operating state of the vehicle in any one mode of the first to fourth modes.

The system may further include an intercooler temperature sensor which measures a temperature of an intercooler, and outputs a corresponding signal, wherein the control unit further receives a signal from the intercooler temperature sensor to determine the operating state of the vehicle, and controls operations of the rotary shutter, the plurality of flaps, and the cooling fan in any one mode of the first to fourth modes.

In another aspect of the present invention, a control method of a system for controlling an air flow rate into a vehicle engine room, the system including an atmospheric temperature sensor which measures an atmospheric temperature, and outputs a corresponding signal, a speed sensor which measures a vehicle speed, and outputs a corresponding signal, an air conditioning pressure sensor which measures air conditioning internal pressure, and outputs a corresponding signal, an air conditioning switch sensor which measures an operational signal of an air conditioning switch, and outputs a corresponding signal, a refrigerant temperature sensor which measures a refrigerant temperature, and outputs a corresponding signal, a fan shroud in which a cooling fan including a fan motor and a fan blade is mounted, a rotary shutter which is provided in the fan shroud while corresponding to an operation area of the fan blade, and in which an area through which air passes is varied in a circumferential direction, a position sensor which measures an open area of the rotary shutter, and outputs a corresponding signal, a plurality of flaps which is provided in the fan shroud, and opens and closes a part of a portion where the rotary shutter is not mounted, and a control unit which controls the open area of the rotary shutter and operations of opening and closing the plurality of flaps in accordance with an operating state of a vehicle, may include determining, by the control unit, the operating state of the vehicle based on sensor signals including signals of the atmospheric temperature sensor, the speed sensor, the air conditioning pressure sensor, the air conditioning switch sensor, the refrigerant temperature sensor, and the position sensor, and determining whether it is required to completely close the rotary shutter in accordance with the determined operating state of the vehicle, and completely closing, by the control unit, the rotary shutter, closing the plurality of flaps, and turning off the operation of the cooling fan in a state in which it is required to completely close the rotary shutter.

The method may further include determining, by the control unit, whether the operating state of the vehicle corresponds to a predetermined low-speed and high-load condition in a case in which it is not required to completely close the rotary shutter, and completely opening, by the control unit, the rotary shutter, closing the plurality of flaps, and controlling the operation of the cooling fan in accordance with the operating state of the vehicle in a case in which the operating state of the vehicle corresponds to a low-speed and high-load condition.

The method may further include determining, by the control unit, whether the operating state of the vehicle corresponds to a predetermined high-speed and high-load condition in a case in which the operating state of the vehicle does not correspond to the low-speed and high-load condition, and completely opening, by the control unit, the rotary shutter, opening the plurality of flaps, and turning off the operation of the cooling fan in a case in which the operating state of the vehicle corresponds to the high-speed and high-load condition.

The method may further include closing, by the control unit, the plurality of flaps, turning off the operation of the cooling fan, and controlling the open area of the rotary shutter in accordance with the operating state of the vehicle in a case in which the operating state of the vehicle does not correspond to the high-speed and high-load condition.

The system for controlling an air flow rate into the vehicle engine room may further include an intercooler temperature sensor which measures a temperature of an intercooler, and outputs a corresponding signal, and the control unit determines the operating state of the vehicle while further including a signal of the intercooler temperature sensor.

According to the system for controlling an air flow rate into a vehicle engine room according to the exemplary embodiment of the present invention and a control method thereof, cooling performance may be improved by controlling use of the cooling fan based on the driving state of the vehicle, and aero-dynamic performance may be improved by adjusting an amount of air flowing into the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9A, FIG. 9B, and FIG. 9C are views illustrating a flap of the system for controlling an air flow rate into a vehicle engine room according to the exemplary embodiment of the present invention.

Figure 1:
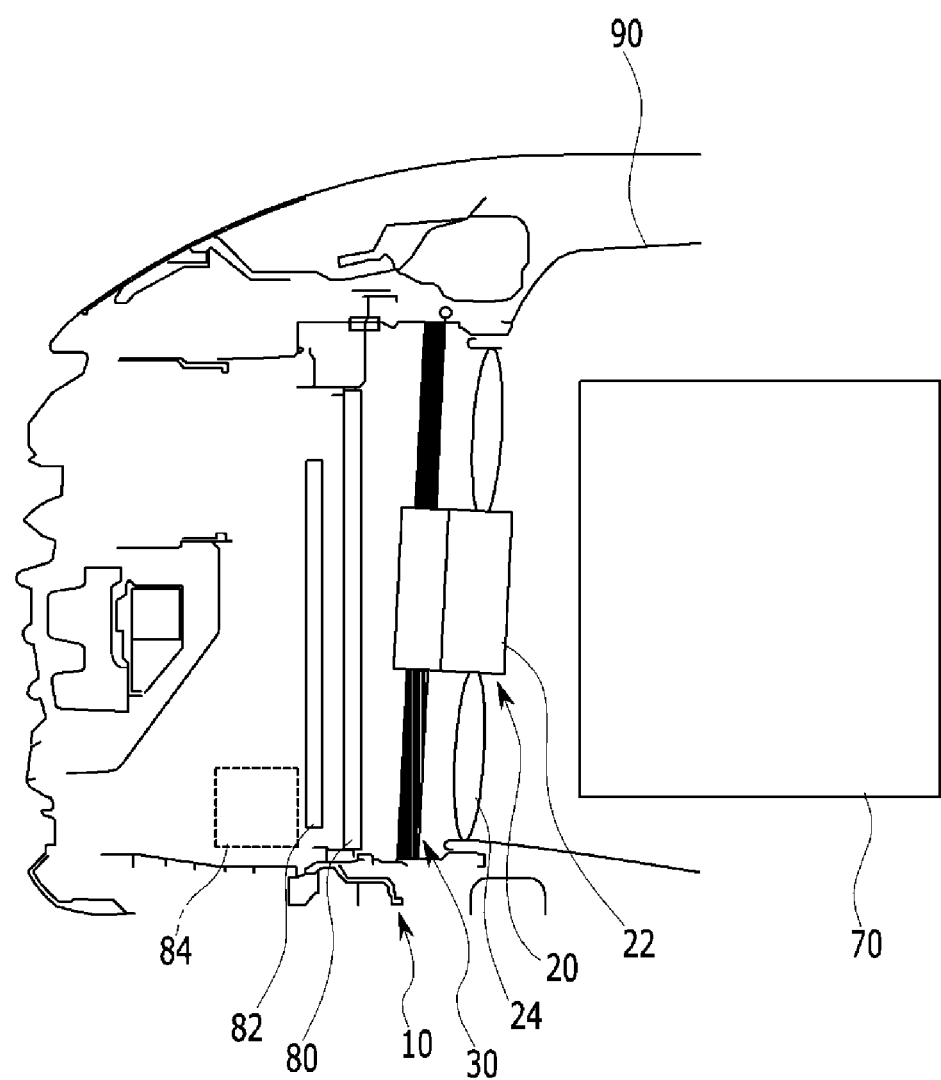
FIG. 1 is a cross-sectional view illustrating a system for controlling an air flow rate into a vehicle engine room according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention Like reference numerals designate like elements throughout the specification.

In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

Throughout the specification and the claims, unless explicitly described to the contrary, the word "comprise" and variations such as "comprises" or "comprising" will be understood to imply the inclusion of stated elements but not the exclusion of any other elements.

An exemplary embodiment of the present invention will hereinafter be described in detail with reference to the accompanying drawings.

Figure 2:
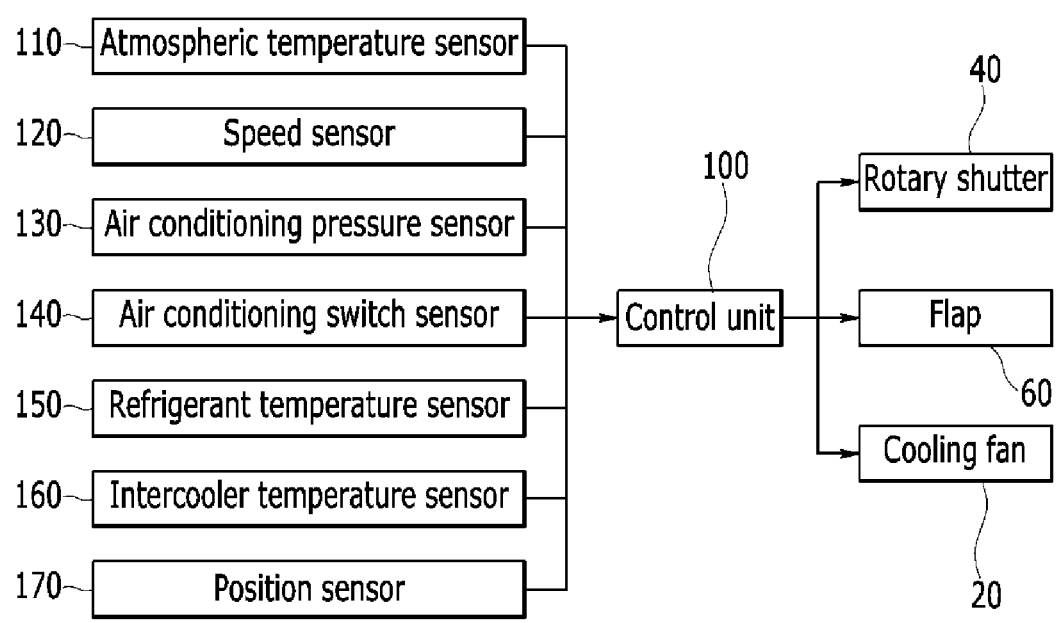
FIG. 2 is a block diagram illustrating the system for controlling an air flow rate into a vehicle engine room according to the exemplary embodiment of the present invention.

FIG. 1 is a cross-sectional view illustrating a system for controlling an air flow rate into a vehicle engine room according to an exemplary embodiment of the present invention, and FIG. 2 is a block diagram illustrating the system for controlling an air flow rate into a vehicle engine room according to the exemplary embodiment of the present invention.

Figure 5:
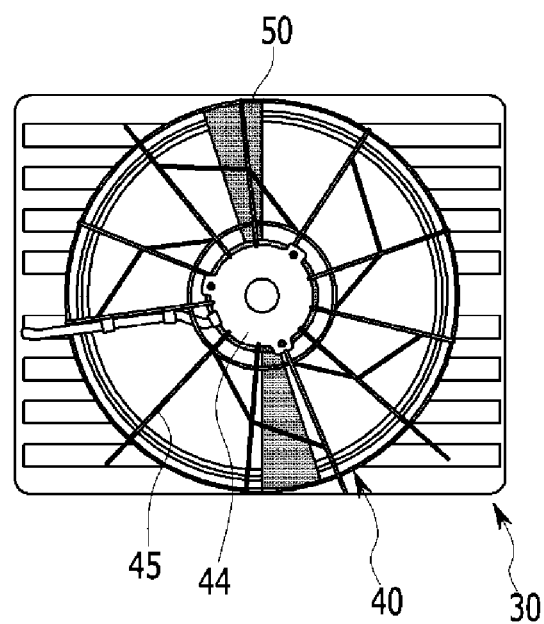
Figure 6:
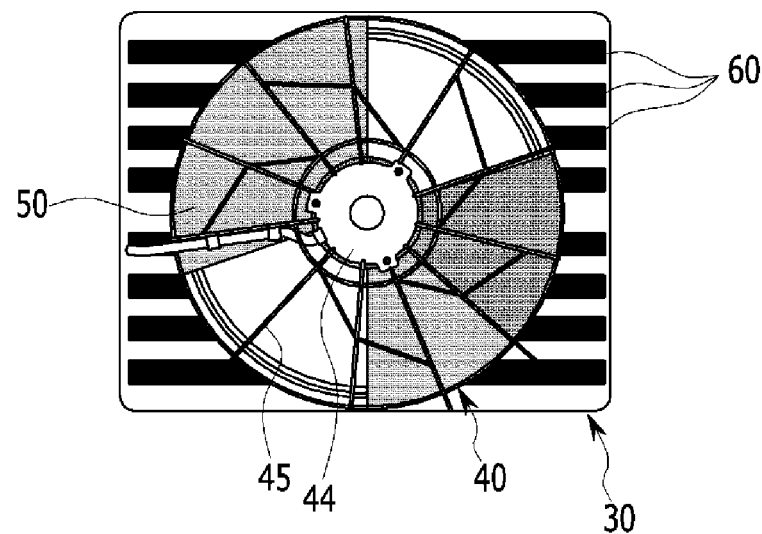
Figure 7A:
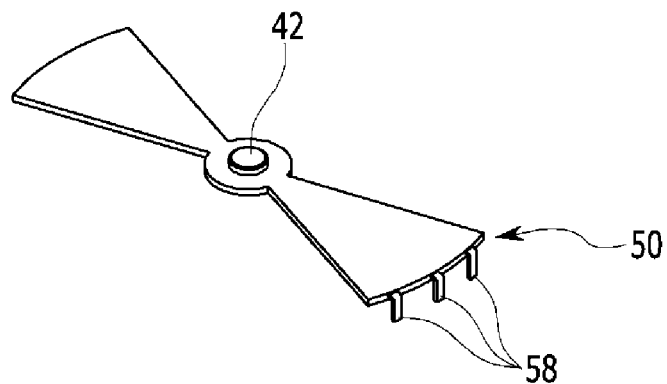
FIG. 7A, FIG. 7B, FIG. 8A, and FIG. 8B are views illustrating a rotary shutter of the system for controlling an air flow rate into a vehicle engine room according to the exemplary embodiment of the present invention.
Figure 7B:
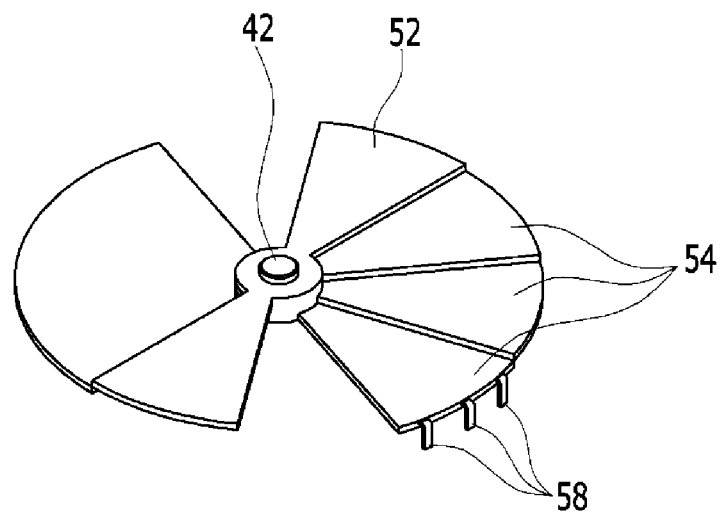
Figure 8A:
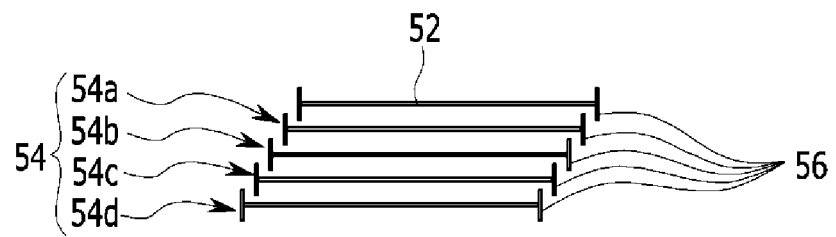
Figure 8B:
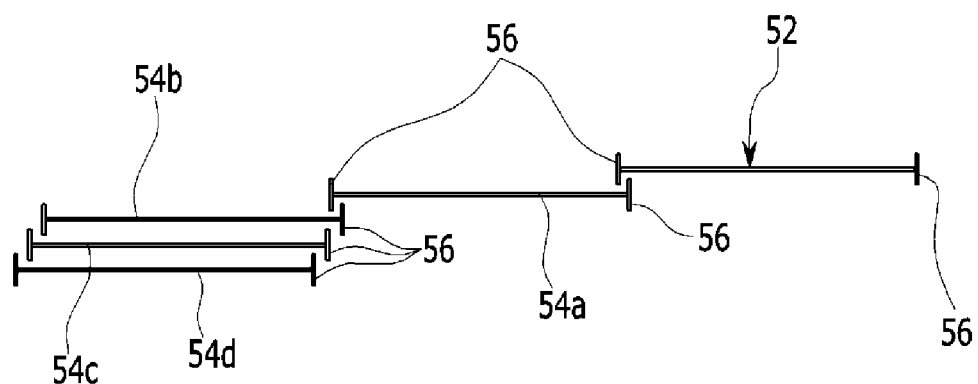

FIGS. 3 to 6 are views illustrating an operating state of a rotary shutter of the system for controlling an air flow rate into a vehicle engine room according to the exemplary embodiment of the present invention, and FIGS. 7 to 8 are views illustrating the rotary shutter of the system for controlling an air flow rate into a vehicle engine room according to the exemplary embodiment of the present invention.

FIG. 9 is a view illustrating a flap of the system for controlling an air flow rate into a vehicle engine room according to the exemplary embodiment of the present invention.

Referring to FIGS. 1 to 9, the system for controlling an air flow rate into a vehicle engine room according to the exemplary embodiment of the present invention may include a fan shroud 30 in which a cooling fan 20 including a fan motor 22 and fan blades 24 is mounted, a rotary shutter 40 which is provided in the fan shroud 30 while corresponding to an operation area of the fan blade 24, and in which an area through which air passes is varied in a circumferential direction, a plurality of flaps 60 which is provided in the fan shroud 30, and opens and closes a part of a portion where the rotary shutter 40 is not mounted, and a control unit 100 which controls an open area of the rotary shutter 40, operations of opening and closing the plurality of flaps 60, and an operation of the cooling fan 20 in accordance with an operating state of a vehicle.

The fan shroud 30 in which the rotary shutter 40 and the plurality of flaps 60 are provided may be provided between an engine 70 and a radiator 80.

A condenser 82 may be provided in front of the radiator 80, and an intercooler 84 may be provided in front of the condenser 82.

In addition, the system for controlling an air flow rate into a vehicle engine room according to the exemplary embodiment of the present invention may further include an encapsulation 90 that surrounds the engine room, and the encapsulation 90 serves to prevent noise and vibration generated in the engine 70 from being transmitted to the outside of the vehicle body 10, and reduce drag by guiding wind, which is generated when the vehicle travels, when the wind flows into the engine room.

In addition, the encapsulation 90 preserves heat generated in the engine 70, and may enable the engine 70 to be operated at an optimum operation temperature when the vehicle travels again in a predetermined time after the vehicle stops.

Referring to FIG. 2, the system for controlling an air flow rate into a vehicle engine room may include an atmospheric temperature sensor 110 which measures an atmospheric temperature, and outputs a corresponding signal, a speed sensor 120 which measures a vehicle speed, and outputs a corresponding signal, an air conditioning pressure sensor 130 which measures air conditioning internal pressure, and outputs a corresponding signal, an air conditioning switch sensor 140 which measures an operational signal of an air conditioning switch, and outputs a corresponding signal, a refrigerant temperature sensor 150 which measures a refrigerant temperature, and outputs a corresponding signal, and a position sensor 170 which measures an open area of the rotary shutter 40, and outputs a corresponding signal.

The control unit 100 determines the operating state of the vehicle based on the corresponding signals from the respective sensor, and controls operations of the rotary shutter 40, the plurality of flaps 60, and the cooling fan 20 in accordance with the operating state of the vehicle.

The system for controlling an air flow rate into a vehicle engine room further includes an intercooler temperature sensor 160 which measures a temperature of the intercooler 84, and outputs a corresponding signal, and the control unit 100 may further receive a signal from the intercooler temperature sensor 160 so as to determine the operating state of the vehicle, and control operations of the rotary shutter 40, the plurality of flaps 60, and the cooling fan 20.

Referring to FIGS. 1, and 3 to 8, the rotary shutter 40 includes a plurality of shutter blades 50 which is provided to be rotatable about the same rotation shaft 42, and a shutter actuator 44 which rotates the plurality of shutter blades 50, and changes an area through which air passes.

The shutter actuator 44 may be a servo motor capable of being rotated in forward and reverse directions, and may be mounted in the fan shroud 30 by mounting supporters 45.

The shutter blades 50 include an operation blade 52 which is rotated about the rotation shaft 42 by an operation of the shutter actuator 44, and a plurality of sub blades 54 which is provided to be superimposed on the basis of the rotation shaft 42 so as to be spread fanwise or folded in accordance with the rotation of the operation blade 52.

FIG. 8 is a view illustrating sides of the shutter blades 50. Referring to FIG. 8, the shutter blades 50 have operation protrusions 56, respectively, and when the operation blade 52 is spread or folded, any one of the plurality of sub blades 54 may be spread or folded, and then the remaining sub blades 54 may be sequentially spread or folded.

As illustrated in FIGS. 7 and 8, the operation blade 52 and the sub blades 54 are superimposed on the basis of the rotation shaft 42, and when the operation blade 52 is rotated about the rotation shaft 42 at a predetermined angle by an operation of the shutter actuator 44, the sub blade 54a, which is closest to the operation blade 52, is rotated while the protrusion 56 of the sub blade 54a is caught by the protrusion 56 of the operation blade 52.

By this manner, the respective sub blades 54a, 54b, 54c, and 54d illustrated in the drawings are sequentially spread fanwise.

On the contrary, when the shutter actuator 44 rotates the operation blade 52 in the reverse direction, the sub blade 54a, which is closest to the operation blade 52, is rotated in the reverse direction while the protrusion 56 of the sub blade 54a is pushed by the opposite protrusion 56 of the operation blade 52.

By this manner, the respective sub blades 54a, 54b, 54c, and 54d illustrated in the drawings are sequentially folded.

Mounting protrusions 58 may be formed on the sub blade 54d that is positioned at the very end among the sub blades 54 so that the sub blade 54d may be fixed to the fan shroud 30.

Referring to FIG. 9, electromagnets 62 are provided on the plurality of flaps 60, such that the plurality of flaps 60 may be opened and closed in accordance with an electric current supplied to the electromagnets 62, and flap rotation shafts 64 are provided on the flaps 60, respectively, so that the flaps 60 may be rotated about the rotation shafts 64, respectively.

The flap rotation shaft 64 may be a torsion spring, and the flap 60 may be maintained in an opened state when the electric current is not supplied to the electromagnet 62. In the case of failure of an electric current supply device, the flap 60 is maintained in the opened state so as to prevent the engine 70 from being overheated.

FIGS. 3 to 6 are views illustrating operation modes of the system for controlling an air flow rate into a vehicle engine room according to the exemplary embodiment of the present invention.

Figure 3:
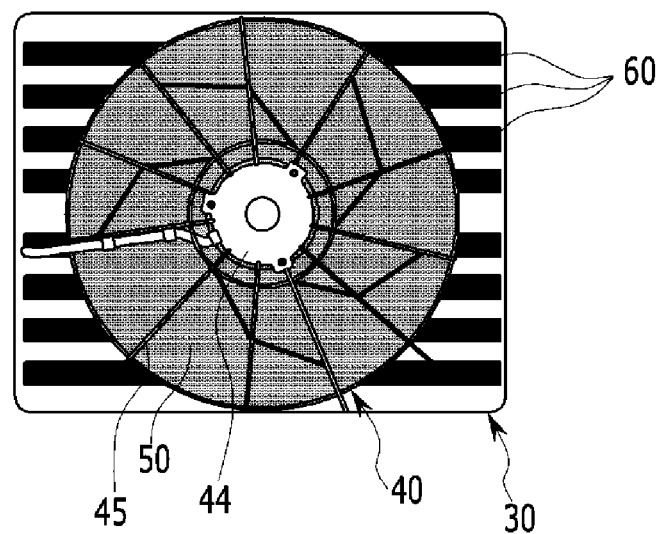
FIG. 3, FIG. 4, FIG. 5, and FIG. 6 are views illustrating operation modes of the system for controlling an air flow rate into a vehicle engine room according to the exemplary embodiment of the present invention.

The operation mode illustrated in FIG. 3 shows a state in which the plurality of flaps 60 is closed, and the rotary shutter 40 is completely closed, and in this case, the operation of the cooling fan 20 may be turned off.

Figure 4:
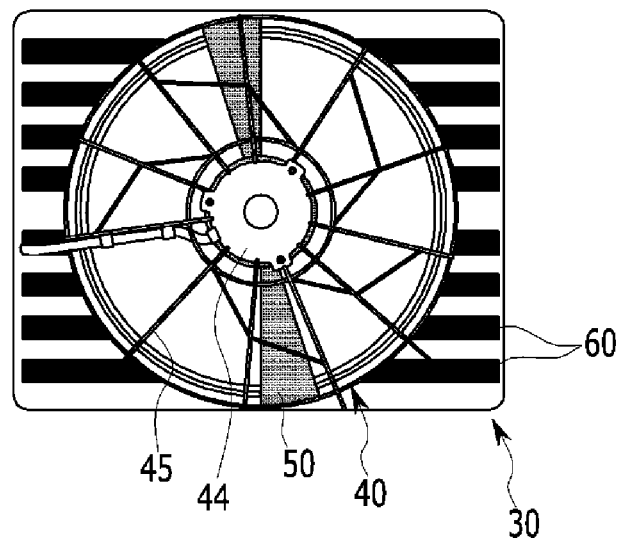

The operation mode illustrated in FIG. 4 shows a state in which the plurality of flaps 60 is closed, and the rotary shutter 40 is completely opened, and in this case, the operation of the cooling fan 20 may be controlled based on the operating state of the vehicle.

The operation mode illustrated in FIG. 5 shows a state in which the plurality of flaps 60 is opened, and the rotary shutter 40 is completely opened, and in this case, the operation of the cooling fan 20 may be turned off.

The operation mode illustrated in FIG. 6 shows a state in which the plurality of flaps 60 is closed, and an open area of the rotary shutter 40 is controlled, and in this case, the operation of the cooling fan 20 may be turned off.

Figure 10:
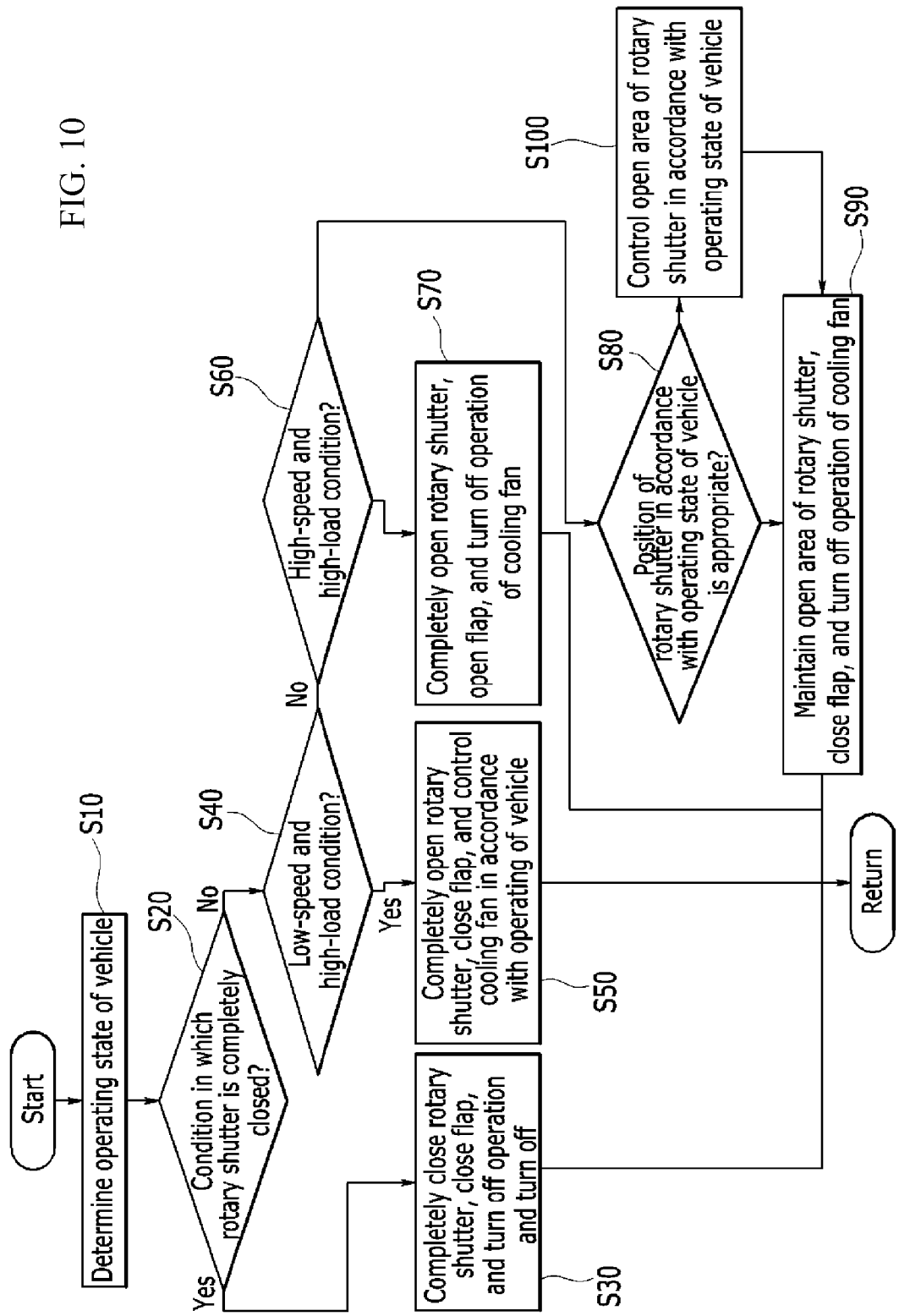
FIG. 10 is a flowchart illustrating a control method of the system for controlling an air flow rate into a vehicle engine room according to the exemplary embodiment of the present invention.

FIG. 10 is a flowchart illustrating a control method of the system for controlling an air flow rate into a vehicle engine room according to the exemplary embodiment of the present invention.

Hereinafter, the control method of the system for controlling an air flow rate into a vehicle engine room according to the exemplary embodiment of the present invention will be described with reference to FIGS. 3 to 10.

The control unit 100 determines the operating state of the vehicle based on sensor signals including signals from the atmospheric temperature sensor 110, the speed sensor 120, the air conditioning pressure sensor 130, the air conditioning switch sensor 140, and the refrigerant temperature sensor 150 (S10), and determines whether it is necessary to completely close the rotary shutter 40 based on the determined operating state of the vehicle (S20).

The state in which it is necessary to completely close the rotary shutter 40 is a state in which cooling is not required, and for example, may be a state in which it is necessary to warm up the engine 70 for a predetermined time after the engine of the vehicle starts, a state in which it is necessary to maintain a temperature of the engine 70 by turning off the engine, and a state in which the vehicle travels in a low-speed and low-load state. The corresponding condition may be stored in a predetermined map in advance, and the control unit 100 may compare the map with the operating state of the vehicle so as to determine whether it is necessary to completely close the rotary shutter 40.

In a case in which it is necessary to completely close the rotary shutter, the control unit 100 completely closes the rotary shutter 40, closes the plurality of flaps 60, and turns off the operation of the cooling fan 20 (S30).

In this case, it is possible to warm up the engine 70 and maintain an appropriate temperature, and aero-dynamic characteristics may be improved by shutting off air flowing into the engine room because the rotary shutter 40 and the plurality of flaps 60 are closed.

In a case in which it is not necessary to completely close the rotary shutter, the control unit 100 determines whether the operating state of the vehicle corresponds to a predetermined low-speed and high-load condition (S40). In a case in which the operating state of the vehicle corresponds to the low-speed and high-load condition, the control unit 100 completely opens the rotary shutter 40, closes the plurality of flaps 60, and controls the operation of the cooling fan 20 in accordance with the operating state of the vehicle (S50).

For example, the predetermined low-speed and high-load condition may mean a state in which a vehicle speed is approximately 30 to 40 kph, and an engine RPM is 2000 to 4000, or may be defined as a state in which cooling by the operation of the cooling fan 20 is required. That is, the low-speed and high-load condition may be defined as a condition in which cooling is required, but cooling by the wind, which is generated when the vehicle travels, is not sufficient.

The corresponding condition is stored in the predetermined map, the control unit 100 may compare the map with the operating state of the vehicle so as to determine whether it is necessary to operate the cooling fan 20, and the control unit 100 controls the operation of the cooling fan 20 in accordance with the operating state of the vehicle. The control unit 100 may operate the cooling fan 20 while determining the number of revolutions of the cooling fan 20 based on the predetermined map, or the control unit 100 may continuously or intermittently operate the cooling fan 20 while determining an operation time of the cooling fan 20.

In a case in which the operating state of the vehicle does not correspond to the low-speed and high-load condition, the control unit 100 determines whether the operating state of the vehicle corresponds to a predetermined high-speed and high-load condition (S60). In a case in which the operating state of the vehicle corresponds to the high-speed and high-load condition, the control unit 100 completely opens the rotary shutter 40, opens the plurality of flaps 60, and turns off the operation of the cooling fan 20 (S70).

For example, the predetermined high-speed and high-load condition may mean a state in which a vehicle speed is approximately 90 to 110 kph, and an engine RPM is 2000 to 4000, or may be defined as a condition in which cooling is required, and cooling by the wind, which is generated when the vehicle travels, is sufficient.

The corresponding condition is stored in the predetermined map, and the control unit 100 may compare the map with the operating state of the vehicle so as to determine whether cooling by the wind, which is generated when the vehicle travels, is required.

In a case in which the operating state of the vehicle does not correspond to the high-speed and high-load condition, the control unit 100 closes the plurality of flaps 60, turns off the operation of the cooling fan 20, and controls the open area of the rotary shutter 40 based on the operating state of the vehicle (S80, S90, and S100).

That is, based on the operating state of the vehicle, the control unit 100 determines whether cooling is required, the operation of the cooling fan 20 is not needed, and the wind flowing into the vehicle needs to be controlled.

The corresponding condition is stored in the predetermined map, the control unit 100 may compare the map with the operating state of the vehicle so as to determine whether the operation of the rotary shutter 40 is required, and the control unit 100 determines the open area of the rotary shutter 40 in accordance with the operating state of the vehicle, and controls the opening operation of the rotary shutter 40.

The control unit 100 determines whether a position of the rotary shutter 40, that is, the open area of the rotary shutter 40 is appropriate using the position sensor 170. That is, the control unit 100 determines whether the current open area of the rotary shutter 40 corresponds to the determined open area of the rotary shutter 40 (S80). In a case in which the current open area of the rotary shutter 40 does not correspond to the determined open area of the rotary shutter 40, the control unit 100 controls the operation of the shutter actuator 44, and controls the open area of the rotary shutter 40 (S100).

Further, the control unit 100 closes the plurality of flaps 60, turns off the operation of the cooling fan 20, and maintains the open area of the rotary shutter 40 (S90).

In a case in which the intercooler 84 is mounted on the engine 70, the control unit 100 may further include the corresponding signal of the intercooler temperature sensor 160 so as to determine the operating state of the vehicle.

As described above, according to the system for controlling an air flow rate into a vehicle engine room according to the exemplary embodiment of the present invention and a control method thereof, cooling performance may be improved by controlling use of the cooling fan based on the driving state of the vehicle, and aero-dynamic performance may be improved by adjusting an amount of air flowing into the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling an air flow rate into a vehicle engine room, comprising:
    a fan shroud in which a cooling fan including a fan motor and a fan blade is mounted;
    a rotary shutter which is provided in the fan shroud while corresponding to an operation area of the fan blade, and in which an area through which air passes is varied in a circumferential direction;
    a plurality of flaps provided in the fan shroud, and opening and closing a part of a portion where the rotary shutter is not mounted; and
    a control unit controlling an open area of the rotary shutter, operations of opening and closing the plurality of flaps, and an operation of the cooling fan in accordance with an operating state of a vehicle,
    wherein operation modes of the system for controlling an air flow rate into a vehicle engine room include:
        a first mode in which the plurality of flaps is closed, the rotary shutter is completely closed, and the operation of the cooling fan is turned off;
        a second mode in which the plurality of flaps is closed, the rotary shutter is completely opened, and the operation of the cooling fan is controlled based on an operating state of the vehicle;
        a third mode in which the plurality of flaps is opened, the rotary shutter is completely opened, and the operation of the cooling fan is turned off; and
        a fourth mode in which the plurality of flaps is closed, the open area of the rotary shutter is controlled, and the operation of the cooling fan is turned off.

2. The system of claim 1, wherein the rotary shutter includes:
    a plurality of shutter blades provided to be rotatable about a rotation shaft; and
    a shutter actuator rotating the plurality of shutter blades, and changes the area through which air passes.

3. The system of claim 2, wherein the shutter blades include:
    an operation blade configured to be rotated about the rotation shaft by an operation of the shutter actuator; and
    a plurality of sub blades provided to be superimposed on a basis of the rotation shaft and engaged to the operation blade to be spread or folded fanwise in accordance with rotation of the operation blade.

4. The system of claim 3, wherein the shutter blades have operation protrusions, respectively, and when the operation blade is spread or folded, any one of the plurality of sub blades is spread or folded, and remaining sub blades are sequentially spread or folded.

5. The system of claim 1, wherein electromagnets are provided on the plurality of flaps so that the plurality of flaps is opened and closed in accordance with an electric current supplied to the electromagnets.

6. The system of claim 1, wherein the fan shroud in which the rotary shutter and the plurality of flaps are provided is provided between an engine and a radiator.

7. The system of claim 6, further comprising an encapsulation which surrounds the vehicle engine room.

8. The system of claim 1, further comprising:
    an atmospheric temperature sensor measuring an atmospheric temperature, and outputting a corresponding signal;
    a speed sensor measuring a vehicle speed, and outputting a corresponding signal;
    an air conditioning pressure sensor measuring air conditioning internal pressure, and outputting a corresponding signal;

an air conditioning switch sensor measuring an operational signal of an air conditioning switch, and outputting a corresponding signal;

a refrigerant temperature sensor measuring a refrigerant temperature, and outputting a corresponding signal; and a position sensor measuring the open area of the rotary shutter, and outputting a corresponding signal, wherein the control unit determines the operating state of the vehicle based on the corresponding signals from the respective sensors, and controls operations of the rotary shutter, the plurality of flaps, and the cooling fan in accordance with the operating state of the vehicle in any one mode of the first to fourth modes.

9. The system of claim 8, further comprising:

an intercooler temperature sensor measuring a temperature of an intercooler, and outputting a corresponding signal, wherein the control unit further receives a signal from the intercooler temperature sensor to determine the operating state of the vehicle, and controls operations of the rotary shutter, the plurality of flaps, and the cooling fan in any one mode of the first to fourth modes.

10. A control method of a system for controlling an air flow rate into a vehicle engine room, the system comprising an atmospheric temperature sensor measuring an atmospheric temperature, and outputting a corresponding signal, a speed sensor measuring a vehicle speed, and outputting a corresponding signal, an air conditioning pressure sensor measuring air conditioning internal pressure, and outputting a corresponding signal, an air conditioning switch sensor measuring an operational signal of an air conditioning switch, and outputting a corresponding signal, a refrigerant temperature sensor measuring a refrigerant temperature, and outputting a corresponding signal, a fan shroud in which a cooling fan including a fan motor and a fan blade is mounted, a rotary shutter which is provided in the fan shroud while corresponding to an operation area of the fan blade, and in which an area through which air passes is varied in a circumferential direction, a position sensor measuring an open area of the rotary shutter, and outputting a corresponding signal, a plurality of flaps which is provided in the fan shroud, and opens and closes a part of a portion where the rotary shutter is not mounted, and a control unit controlling the open area of the rotary shutter and operations of opening and closing the plurality of flaps in accordance with an operating state of a vehicle, and the method comprising:

determining, by the control unit, the operating state of the vehicle based on sensor signals including signals of the atmospheric temperature sensor, the speed sensor, the air conditioning pressure sensor, the air conditioning switch sensor, the refrigerant temperature sensor, and the position sensor, and determining whether it is required to completely close the rotary shutter in accordance with the determined operating state of the vehicle;

completely closing, by the control unit, the rotary shutter, closing the plurality of flaps, and turning off the operation of the cooling fan in a state in which it is required to completely close the rotary shutter;

determining, by the control unit, whether the operating state of the vehicle corresponds to a predetermined low-speed and high-load condition in a case in which it is not required to completely close the rotary shutter;

completely opening, by the control unit, the rotary shutter, closing the plurality of flaps, and controlling the operation of the cooling fan in accordance with the operating state of the vehicle in a case in which the operating state of the vehicle corresponds to a low-speed and high-load condition;

determining, by the control unit, whether the operating state of the vehicle corresponds to a predetermined high-speed and high-load condition in a case in which the operating state of the vehicle does not correspond to the low-speed and high-load condition;

completely opening, by the control unit, the rotary shutter, opening the plurality of flaps, and turning off the operation of the cooling fan in a case in which the operating state of the vehicle corresponds to the high-speed and high-load condition; and closing, by the control unit, the plurality of flaps, turning off the operation of the cooling fan, and controlling the open area of the rotary shutter in accordance with the operating state of the vehicle in a case in which the operating state of the vehicle does not correspond to the high-speed and high-load condition.

11. The method of claim 10, wherein the system for controlling an air flow rate into the vehicle engine room further includes an intercooler temperature sensor which measures a temperature of an intercooler, and outputs a corresponding signal, and wherein the control unit determines the operating state of the vehicle while further including a signal of the intercooler temperature sensor.

* * * * *